Patented Nov. 3, 1925.

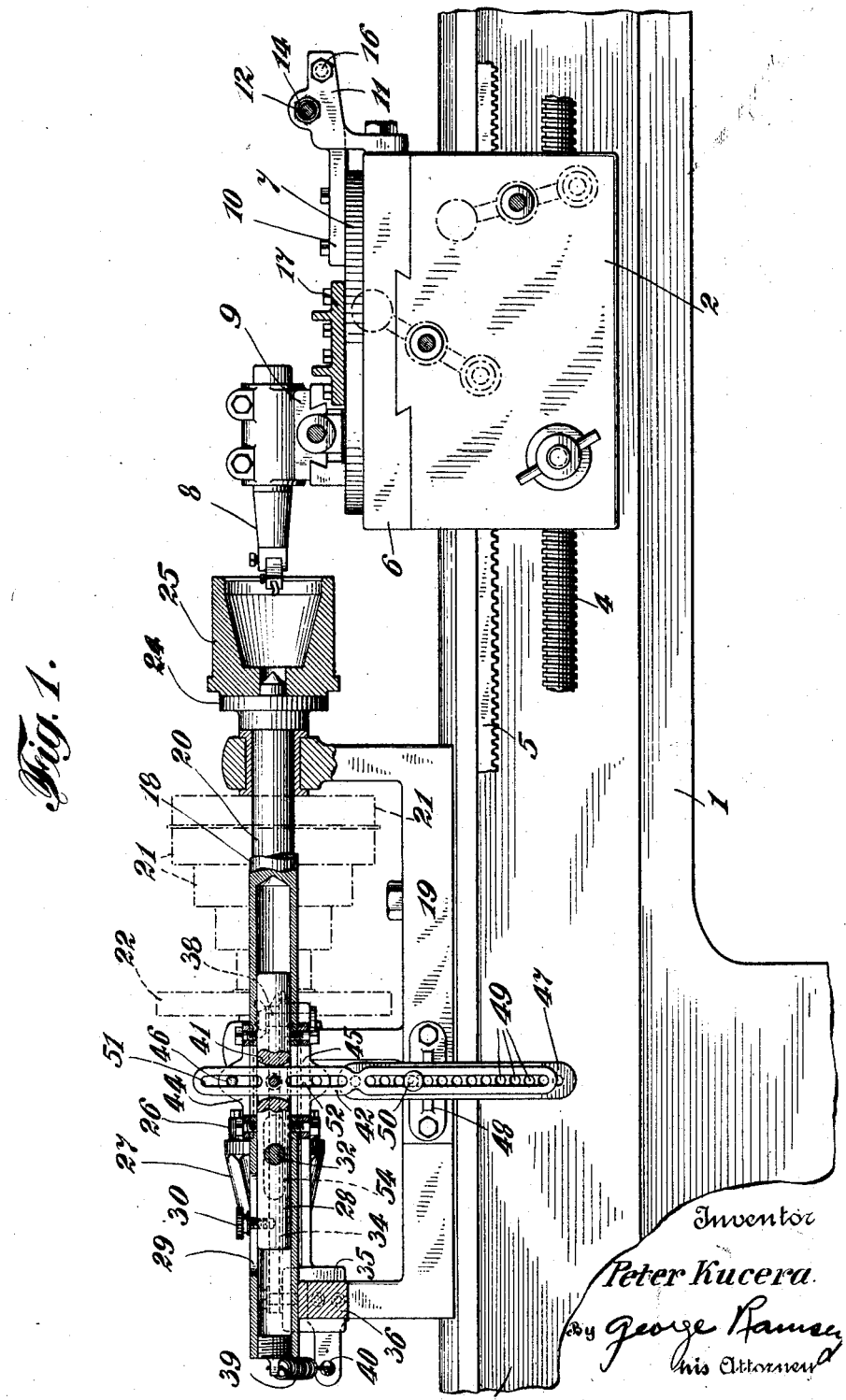

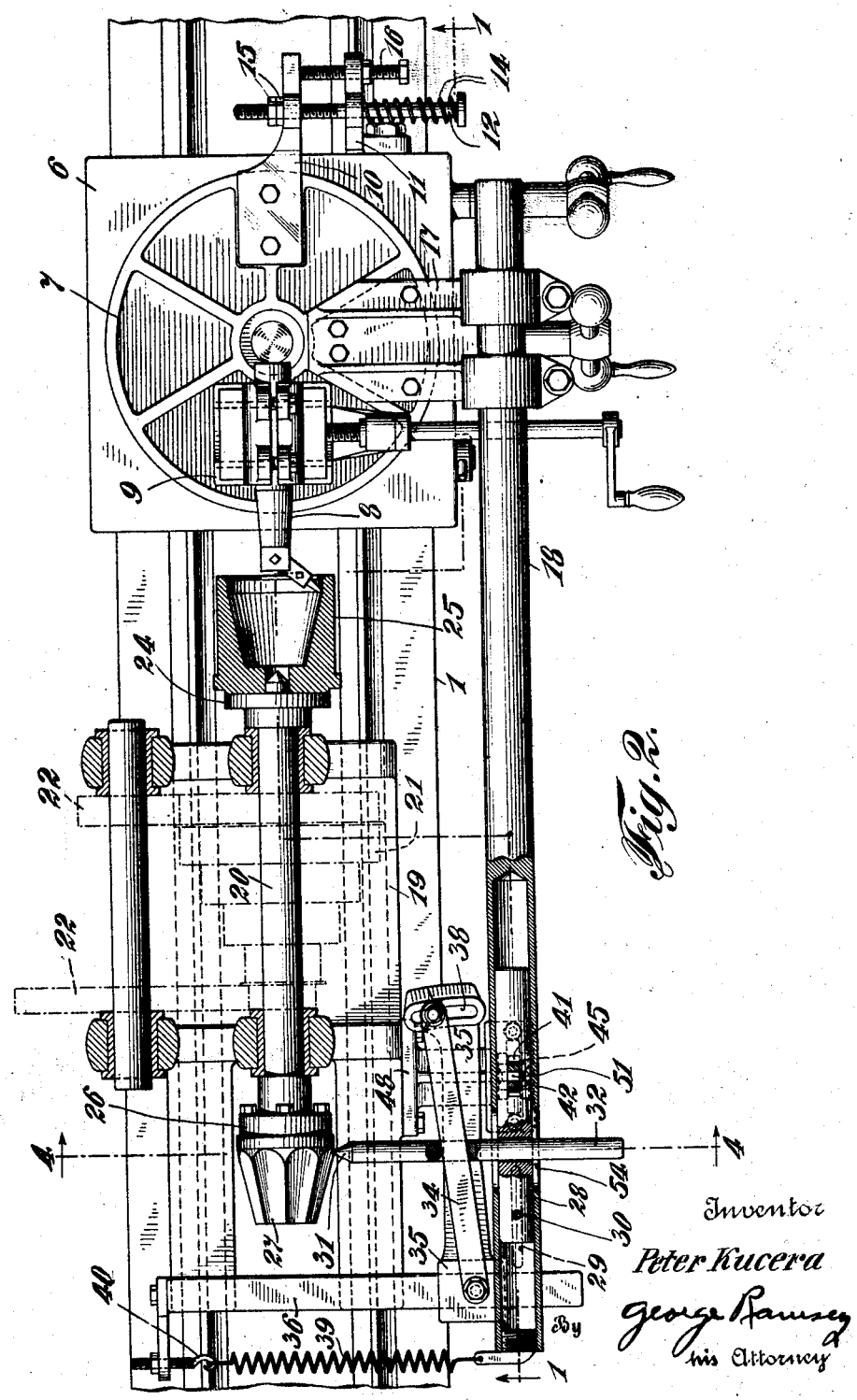

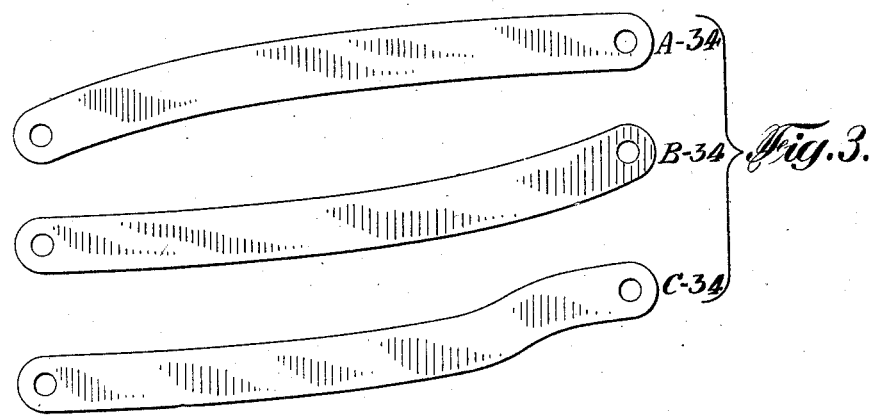
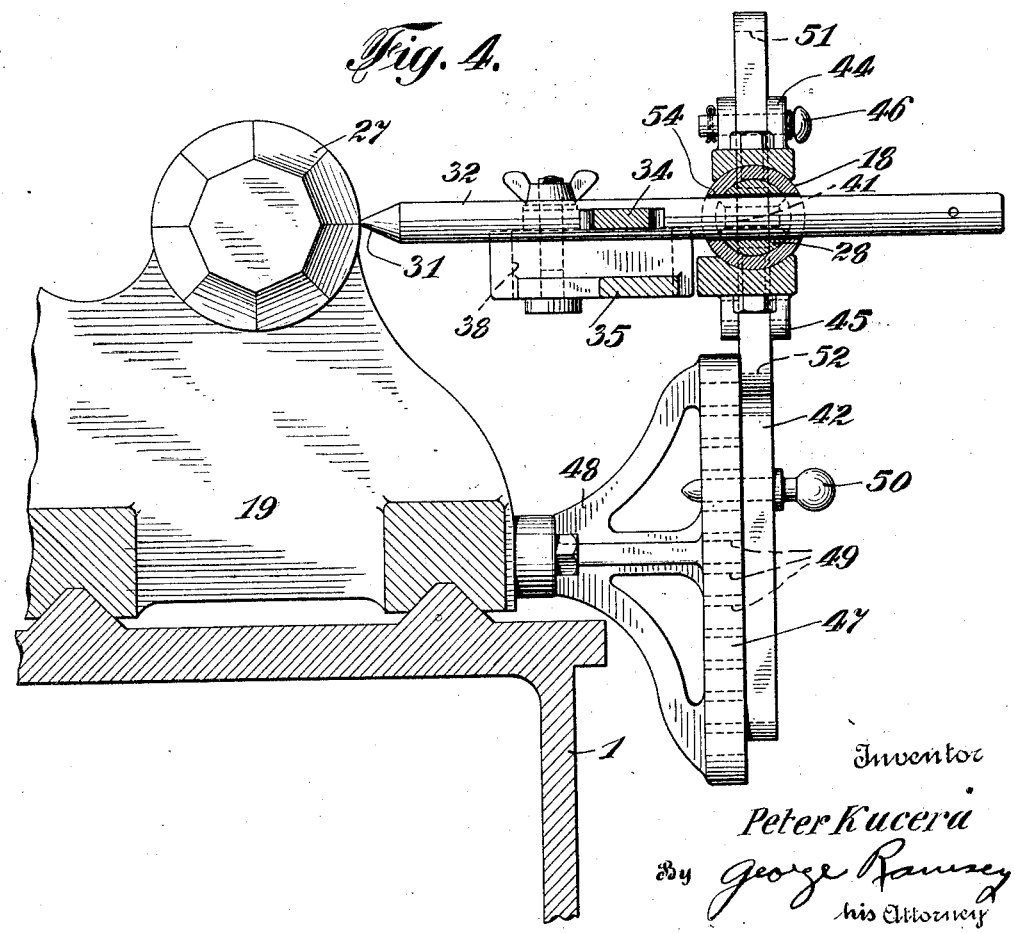

1,560,064

UNITED STATES PATENT OFFICE.

PETER KUCERA, OF SOUTH CONNELLSVILLE, PENNSYLVANIA, ASSIGNOR TO CAPSTAN GLASS COMPANY, OF CONNELLSVILLE, PENNSYLVANIA, A CORPORATION OF DELAWARE.

FORMING MACHINE.

Application filed December 10, 1921. Serial No. 521,315.

*To all whom it may concern:*

Be it known that I, PETER KUCERA, a citizen of the United States, residing at South Connellsville, in the county of Fayette, State of Pennsylvania, have invented certain new and useful Improvements in Forming Machines, of which the following is a specification.

This invention relates broadly to devices for use in the manufacture of configurated objects and more specially for use in manufacturing block molds for glass machines.

The principal object of the present invention is a device for modifying the resultant path of the forming tool guided by a standard shaped form.

A further object of the present invention is a device of the character specified wherein the path of the forming tool guided by a standard shaped form is controlled by a modifying mechanism.

A further object of the present invention is a device of the character specified wherein the path of the forming tool is modified or changed in such manner as to produce an outline comprising a species of form determined by a standard pattern form.

A still further object of the present invention is a device for automatically shaping block molds or the like and for varying the shape of such molds from the shape of a standard form by varying the relative movement of a tracer point, in its travel over a standard form, to the movement of a forming tool over the block mold being shaped.

A still further object of the present invention is a device of the character specified wherein constructions are provided to permit the forming tool to travel over the mold being shaped in a longitudinal direction at a different rate of speed from the longitudinal travel of a tracing point over a standard form.

A further and important object of the present invention is a device of the character specified provided with means whereby the path of movement of the forming tool in a lateral direction varies from the path of movement of the tracer point in a lateral direction in its passage over the surface of a standard form.

Another and more specific object of the present invention is a device of the character specified and wherein the means for controlling the variation in lateral movement between the forming tool and the tracer point is a removable or adjustable means so that the change or variation specified is under control of the operator.

Another and still more specific object of the present invention is a device of the character specified and wherein the path of the forming tool may be varied both in its lateral travel and in its longitudinal travel relatively to the lateral travel and longitudinal travel of a tracer point over a standard form whereby a large variety of species of forms may be developed by the forming tool without changing the standard form.

Other and further objects of the present invention will in part be obvious and will in part be pointed out hereinafter in the specification following by reference to the accompanying drawings forming a part of this specification.

Figure 1 is an elevational view of one form of the invention taken on line 1—1 Figure 2;

Figure 2 is a plan view of the device shown in Figure 1;

Figure 3 illustrates three forms of lateral control bars;

Figure 4 is an end view taken on section 4—4 of Figure 1;

Figure 5:
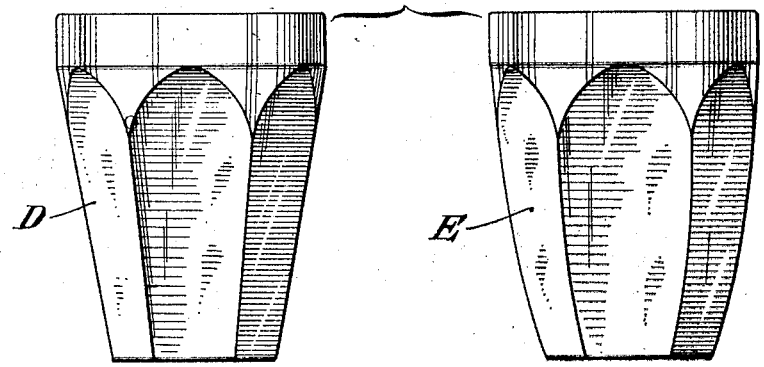
Figure 5 is a view illustrating tumbler forms generated from a standard form by varying the lateral motion of the tracer point.

The present invention is an improvement over my prior invention in that the pattern utilized becomes a genus of shapes or forms from which a large number of species may be made according to the desires of the operator. After a master pattern is formed to comprise a genus, species of this genus may vary therefrom in lateral; i. e., in cross-section; and longitudinally i. e., in length dimensions. Therefore the present device permits the operator to control the relative travel between a tracer point, in its path on the master pattern, and a forming tool so that a particular design may be varied either lengthwise or laterally. This enables the operator to so set the machine as to produce long slim molds or short thick molds of the same general form from a single master pattern. It also enables the operator to produce combinations of these variations so that the range of shapes which may be obtained from one master pattern is very numerous. This has the very great advantage of enabling the manufacturer to economically produce a great number of shapes from a single master pattern and furthermore enables the manufacturer to reproduce any previous shape with accuracy and certainty.

Referring now to the drawings which illustrate one embodiment of the present invention, the machine bed 1 carries a feed carriage 2 which is adapted to cooperate with the usual feed screw 4 and feed rack 5, as is common in the art of lathes, etc. The feed carriage is provided with a cross feed 6 upon which is mounted a turret 7 that carries a forming tool 8 which is mounted upon a small independent cross carriage 9. An arm 10 extends from the turret 7 and a bracket 11 is secured to the cross feed 6. A screw bolt 12 extends through the arm 10 and the bracket 11 and carries a coiled spring 14 which causes the lock nuts 15 on the bolt 12 to tend to draw the arm 10 toward the bracket 11. A stop bolt 16 is mounted in the bracket 11 in such manner that the end thereof engages the end of the arm 10 and limits the movement of the arm under the influence of the spring 14 on the bolt 12. The turret 7 is provided with a carrying arm 17 which adjustably supports a control arm 18 which carries a tracing apparatus which will later be described.

The machine bed 1 carries a head stock 19 in which is mounted a main shaft 20 that is connected by suitable gearing such as a cone pulley 21 and a back gear 22, all of which is common in the art. The main shaft 20 is provided on its forward front end with a face plate 24 on which is mounted the block mold 25 to be operated upon by the forming tool 8. The rear end of the main shaft 20 carries a back plate 26 upon which is mounted the master pattern or form 27.

The present invention, while embodying the mechanical elements hereinbefore specified as a combination in an operative machine, resides more particularly in the control mechanism for the tracer which is adapted to cooperate with the master pattern 27. The control arm 18 preferably is hollow and a sliding block 28 is mounted in the free end of this control arm. The control arm is slotted as at 29 and a stub screw 30 extends through the slot 29 so that the sliding block 28 may be tightly clamped in a predetermined position in the control arm 18 when it is desirable to prevent the block 28 from sliding in the arm 18.

When this is done the sliding block 28 travels with the control arm 18. The tracer bolt 32 is slotted and a taper bar 34 extends through this slot in the bolt 32. The taper bar is pivoted at one end to a frame 35 which slides upon the control arm support 36. The other end of the taper bar is adjustable by sliding the arcuate slot 38 in the end of the frame 35. In view of the fact that the frame 35 fits over the control arm support 36 as is indicated in Figure 1, the frame 35 may move laterally but cannot move longitudinally relatively to the master pattern. It will also be observed that the bolt 32 may slide on the taper arm 34 and that the frame 35 is normally pressed against the control arm 18 by the point 31 of the tracer bolt which is held against the master pattern 27 by means of the springs 39 and 14; since the spring 39 is connected with a hook on the end of the control arm and also with an adjusting hook 40 anchored on the support 36. When the sliding block 28 is clamped to the control arm 18 and the taper bar 34 is set on zero with the front edge thereof parallel to the control arm 18, the control arm 18 will follow the tracer point 31 in its movement over the master pattern 27 and the forming tool 8 will cut a configuration in the block mold 25 which is a replica of the configuration of the master pattern 27. If, however, the taper bar 34 be inclined as shown in Figure 2, the distance between the control arm 18 and the point on the master pattern which is in contact with the tracer point will vary as the tracer bolt 32 slides on the taper bar. This variation, when the straight bar 34 is used, will be constant and the forming tool will trace a species shape which tapers more than the master pattern but is the same genus in form and a tumbler made from such a block mold will have the appearance of the tumbler D, Figure 5.

Tracer bars 34 are removable and may be of various shapes, as is indicated in Figure 3. The tracer bar $A^{34}$ in Figure 3 will produce a tumbler of the configuration shown in E, Figure 5. Where the concave bar $B^{34}$ is used the side wall of the tumbler will be of the concave shape, as indicated in F, Figure 7, and wherein an ogee shaped bar $C^{34}$ is used the side wall of the tumbler will have an ogee shape as the tumbler G in Figure 7. The mechanism described controls more specially the variations from the master pattern in lateral or cross sectional form.

Figure 6:
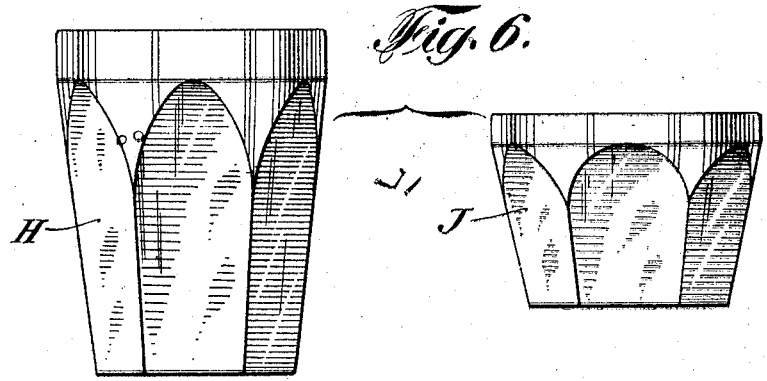
Figure 6 illustrates tumbler forms made by varying the longitudinal traveling of forming tool relatively to the standard point.
Figure 7:
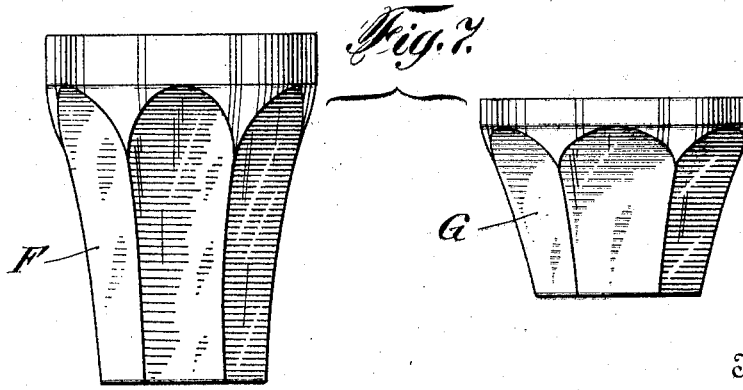
Figure 7 illustrates tumbler forms made by varying both the lateral and longitudinal travel of the forming tool relatively to the tracer point.

Referring now more specially to Figures 1 and 4 it will be noted that the block 28 is recessed as at 41 and a swinging bar 42 is pivoted in recess 41. Bracket ears 44 and 45 are provided on the control arm 18 on each side of the recess 41. These bracket ears are adapted to carry a removable fulcrum which may be placed in either one or the other pair of bracket ears. A side plate 47 is mounted on the head 48 which carries the control arm support 36 and the side plate 47 extends adjacent the pendant portion of the swinging bar 42. This side plate is provided with a plurality of openings 49 which are adapted to receive an adjustment pin 50. When the pin 46 is in the upper pair of ears 44 and extends through the upper slot 51 in the swinging bar 42 and the adjustment pin 50 is in one of the openings 49 in the side plate 47, it will be noted that the longitudinal movement to the control bar 18, due to feed of the carriage 2, causes the swinging arm 42 to swing on the pin 50 as a fulcrum and thus draw the sliding block 48 backwardly thereby retarding the longitudinal movement of the sliding block 48 that carries the tracer bolt 32. Consequently the tracing action does not progress in a longitudinal direction as rapidly as the forming tool enters the mold, consequently the pattern is elongated and the loops on the ends of the flutes of the master pattern 27 will assume an elongated appearance so that a tumbler made from such a mold will appear as the tumbler H in Figure 6. If on the other hand the fulcrum pin 46 is removed from the upper pair of ears 44 and is placed in position through the lower pair of ears 45 and through the lower slot 52 in the swinging bar 42 the sliding block 28 will move faster than the longitudinal movement of the control arm 18, and in the same longitudinal direction as the control bar 18 so that the tracer point will travel over the pattern more rapidly than the forming tool cuts into the block mold and therefore the resultant configuration will be flattened so that the mold will be shorter so far as the shape is concerned than is the actual master pattern and a tumbler made from such a mold will appear as the tumbler J, Figure 6. It is understood that when the swinging bar 42 is operated the stub screw 30 is released so that the sliding block 28 is freely movable in the control arm 18 and that the bolt 32 slides in the opening 54 formed in the side of the control arm 18.

Where both the bar 34 and the swinging bar 42 are operated, effects may be produced which embody combinations of the two results and such combinations are indicated in Figure 7. The mold for the tumbler G is formed from an angularly set ogee taper bar C³⁴ and with the swinging bar fulcrum pin 46 in the lower pair of ears 45 so that sliding bar 28 was accelerated and covered the master pattern during a relatively short travel of the forming tool. The tumbler F was made from a mold which was formed by the combination action of the taper bar and the swinging bar and wherein an ogee taper bar was used and the fulcrum pin 46 was placed in the upper slot 51 through the upper ears 44 so that the sliding block 28 was retarded and the forming tool travelled a relatively longer distance than did the tracer point over the master pattern, the consequence being that the mold form was elongated.

From the foregoing it will be noted that a great variety of molds may be formed from a single pattern and all of the varieties are directly under control of the operator, and are all species of the genus which is determined by the master pattern.

Having thus described my invention, what I claim is:

1. A machine for forming shapes comprising a pattern, a tool guided by said pattern, a taper bar to cause said tool to vary laterally from the normal path of the tool as controlled by said pattern, and a travel control lever for controlling the effective length of the pattern.

2. A machine for forming shapes comprising a pattern, a tool guided by said pattern, a taper bar to cause said tool to vary laterally from the normal path of the tool as controlled by said pattern, means to adjust said taper bar, a travel control lever for controlling the effective length of the pattern, and means to adjust said lever to predetermine the effect thereof upon the final form.

3. A device of the class described comprising a master pattern, means to simultaneously rotate said pattern and a member to be shaped, a tool carriage moveable longitudinally of the member to be shaped, a forming tool pivotally mounted on said carriage, a lever adapted to rotate said tool about its pivot, a tracer cooperating with said master pattern and adapted to impart movement to said lever, and means to cause relative movement in at least one direction between said tracer and said lever as said tracer moves over said master pattern.

4. A device of the class described comprising a master pattern, means to simultaneously rotate said pattern and a member to be shaped, a tool carriage movable longitudinally of the member to be shaped, a forming tool pivotally mounted on said carriage, a lever adapted to rotate said tool about its pivot, a tracer cooperating with said master pattern and adapted to impart movement to said lever, and means to cause relative movement in at least one direction between said tracer and said lever as said tracer moves over said master pattern, said means to cause relative movement being adjustable to vary the law of said movements.

5. A device of the class described comprising a master pattern, means to simultaneously rotate said pattern and a member to be shaped, a tool carriage moveable longitudinally of the member to be shaped, a forming tool pivotally mounted on said carriage, a lever adapted to rotate said tool about its pivot, a tracer cooperating with said master pattern and adapted to impart movement to said lever, and means to cause relative movement in a plurality of direction between said tracer and said lever as said tracer moves over said master pattern.

6. A device of the class described comprising a master pattern, means to simultaneously rotate said pattern and a member to be shaped, a tool carriage moveable longitudinally of the member to be shaped, a forming tool pivotally mounted on said carriage, a lever adapted to rotate said tool about its pivot, a tracer cooperating with said master pattern and adapted to impart movement to said lever, and means to cause relative movement in a plurality of direction between said tracer and said lever as said tracer moves over said master pattern, said means to cause relative movement being adjustable to vary the law of the relative movements in each of the plurality of directions.

7. A device of the class described comprising a master pattern, means to simultaneously rotate said pattern and a member to be shaped, a tool carriage, a forming tool pivoted to said carriage and adapted to form the member to be shaped, means to move said carriage longitudinally of the member to be shaped, and means to rotate said tool about its pivot to effect the production of a configuration which is any one of a plurality of shapes of which the master pattern is the genus.

8. A device of the class described comprising a master pattern, means to simultaneously rotate said pattern and a member to be shaped, a tool adapted to shape the member, a tracer cooperating with said master pattern and movable in two directions, means to impart motion to said tool governed by each of the two motions of said tracer, and means to vary the law of the motion of said tool in response to at least one of the motions of said tracer.

9. A device of the class described comprising a master pattern, means to simultaneously rotate said pattern and a member to be shaped, a tool adapted to shape the member, a tracer cooperating with said master pattern and movable in two directions, means to impart motion to said tool governed by each of the two motions of said tracer, and means to vary the law of the motion of said tool in response to each of the motions of said tracer.

10. In a device of the class described, a tracer adapted to cooperate with a pattern, means adapted to control a shaping operation, said tracer being slideably associated with said means, and means to impress upon said tracer a definite law of sliding movement of said tracer relative to said controlling means as said tracer moves in cooperation with said pattern.

11. In a device of the class described, a tracer adapted to cooperate with a pattern, means adapted to control a shaping operation, said tracer being slideably associated with said means in two directions and means to impress upon said tracer a definite law of sliding movement of said tracer in at least one of its motions relative to said controlling means as said tracer moves in cooperation with said pattern.

12. In a device of the class described, a tracer adapted to cooperate with a pattern, means adapted to control a shaping operation, said tracer being slideably associated with said means in two directions, and means to impress upon said tracer a definite law of sliding movement of said tracer in both of its motions relative to said controlling means as said tracer moves in cooperation with said pattern.

13. In a device of the class described, a tracer adapted to cooperate with a pattern, means adapted to control a shaping operation, said tracer being slideably associated with said means, and means to impress upon said tracer a definite law of sliding movement of said tracer relative to said controlling means as said tracer moves in cooperation with said pattern, said impressing means being adjustable to vary the law of the motion impressed.

14. In a device of the class described, a tracer adapted to cooperate with a pattern, means adapted to control a shaping operation, said tracer being slideably associated with said means in two directions, and means to impress upon said tracer a definite law of sliding movement of said tracer in both of its motions relative to said controlling means as said tracer moves in cooperation with said pattern, said impressing means being adjustable to vary the law of the motion impressed in each of the two directions.

15. In a device of the class described, a master model, means to simultaneously rotate said model and a member to be shaped, a tool carriage movable longitudinally of the member to be shaped, a forming tool movably mounted on said tool carriage, a lever adapted to move said tool on said carriage to control a forming operation, a block slideable longitudinally of said lever, a tracer slideably associated with said block, yielding means for holding said tracer in contact with said model, a taper bar adapted to adjust said tracer relative to said block as said tracer moves longitudinally of said model, and means to slide said block longitudinally of said lever as said tracer moves longitudinally of said model.

16. In a device of the class described, a master model, means to simultaneously rotate said model and a member to be shaped, a tool carriage movable longitudinally of the member to be shaped, a forming tool movably mounted on said tool carriage, a lever adapted to move said tool on said carriage to control a forming operation, a block slidable longitudinally of said lever, a tracer slideably associated with said block, yielding means for holding said tracer in contact with said model, a taper bar adapted to adjust said tracer relative to said block as said tracer moves longitudinally of said model, said taper bar being adjustable to vary the law of adjustment of said tracer, and means to slide said block longitudinally of said lever as said tracer moves longitudinally of said model.

17. In a device of the class described, a master model, means to simultaneously rotate said model and a member to be shaped, a tool carriage moveable longitudinally of the member to be shaped, a forming tool movably mounted on said tool carriage, a lever adapted to move said tool on said carriage to control a forming operation, a block slideable longitudinally of said lever, a tracer slideably associated with said block, yielding means for holding said tracer in contact with said model, a taper bar adapted to adjust said tracer relative to said block as said tracer moves longitudinally of said model, said taper bar being adjustable to vary the law of adjustment of said tracer, and means to slide said block longitudinally of said lever as said tracer moves longitudinally of said model, said means being adjustable to vary the law of movement of said block relative to said lever.

18. In a device of the class described, a master model, means to simultaneously rotate said model and a member to be shaped, a tool carriage movable longitudinally of the member to be shaped, a forming tool movably mounted on said tool carriage, a lever adapted to move said tool on said carriage to control a forming operation, said tool being movable independently of the motion of said lever, a block slideable longitudinally of said lever, a tracer slideably associated with said block, yielding means for holding said tracer in contact with said model, a taper bar adapted to adjust said tracer relative to said block as said tracer moves longitudinally of said model, and means to slide said block longitudinally of said lever as said tracer moves longitudinally of said model.

19. In a device of the class described, a tracer adapted to cooperate with a pattern, means adapted to control a shaping operation, said tracer being movably associated with said means, and means to impress upon said tracer a definite law of movement of said tracer relative to said controlling means.

20. In a device of the class described, a tracer adapted to cooperate with a pattern, means adapted to control a shaping operation, said tracer being movably associated with said means, and means to impress upon said tracer a definite law of movement of said tracer relative to said controlling means, said impressing means being adjustable to vary the law of the motion impressed.

21. In a device of the class described, a tracer adapted to cooperate with a pattern, means adapted to control a shaping operation, said tracer being movably associated with said means in two directions, and means to impress upon said tracer a definite law of movement of said tracer in at least one of its motions relative to said controlling means.

22. In a device of the class described, a tracer adapted to cooperate with a pattern, means adapted to control a shaping operation, said tracer being movably associated with said means in two directions and means to impress upon said tracer a definite law of movement of said tracer in both of its motions relative to said controlling means, said impressing means being adjustable to vary the law of the motion impressed in each of the two directions.

PETER KUCERA.